(12) United States Patent
Dallinger et al.

(10) Patent No.: US 10,738,431 B2
(45) Date of Patent: Aug. 11, 2020

(54) CONNECTION STRUCTURE FOR A MARINE INSTALLATION, MARINE INSTALLATION AND METHOD OF ERECTING A MARINE INSTALLATION

(71) Applicant: SIEMENS AKTIENGESELLSCHAFT, Munich (DE)

(72) Inventors: Wolfgang Dallinger, Schwarzenbek (DE); Thorsten Steinhoff, Hamburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/281,340

(22) Filed: Feb. 21, 2019

(65) Prior Publication Data
US 2019/0257051 A1 Aug. 22, 2019

(30) Foreign Application Priority Data
Feb. 21, 2018 (EP) ..................................... 18157798

(51) Int. Cl.
| | |
|---|---|
| *E02B 17/00* | (2006.01) |
| *F03D 80/00* | (2016.01) |
| *E02D 27/16* | (2006.01) |
| *E02D 27/52* | (2006.01) |
| *H02G 3/22* | (2006.01) |

(Continued)

(52) U.S. Cl.
CPC .......... *E02B 17/00* (2013.01); *E02B 17/0004* (2013.01); *E02B 17/027* (2013.01); *E02D 27/16* (2013.01); *E02D 27/525* (2013.01); *F03D 80/00* (2016.05); *H02G 3/22* (2013.01); *H02G 9/00* (2013.01); *E02B 2017/0043* (2013.01); *E02B 2017/0056* (2013.01); *E02B 2017/0065* (2013.01); *E02B 2017/0078* (2013.01); *E02B 2017/0091* (2013.01); *E02B 2017/0095* (2013.01); *E02D 2600/30* (2013.01); *F03D 9/255* (2017.02); *F03D 13/25* (2016.05);

(Continued)

(58) Field of Classification Search
CPC ..... E02B 2017/0039; E02B 2017/0043; E02B 2017/0056; E02B 2017/0065; E02B 2017/0091; E02B 2017/0095
USPC .......................................... 405/204
See application file for complete search history.

(56) References Cited

U.S. PATENT DOCUMENTS

| | | | | |
|---|---|---|---|---|
| 3,916,632 A | * | 11/1975 | Thomas ................ | E02B 17/021 405/196 |
| 4,746,245 A | * | 5/1988 | Mork .................... | E02B 17/025 405/224 |

(Continued)

FOREIGN PATENT DOCUMENTS

| | | | | |
|---|---|---|---|---|
| EP | 39590 A2 | * | 11/1981 | ............. E02B 17/02 |
| EP | 2597227 A1 | | 5/2013 | |

(Continued)

*Primary Examiner* — Frederick L Lagman
(74) *Attorney, Agent, or Firm* — Iar; Werner Stemer; Ralph Locher

(57) ABSTRACT

A connection structure for connecting a seabed anchor to a superstructure for electrical power engineering has a horizontally encircling, vertically extending wall, which bounds a spatial region inside the connection structure. A first connecting section is configured for connection to the superstructure. A second connecting section is configured for connection to the seabed anchor.

10 Claims, 8 Drawing Sheets

(51) Int. Cl.
  H02G 9/00   (2006.01)
  E02B 17/02  (2006.01)
  H02G 3/30       (2006.01)
  F03D 9/25       (2016.01)
  F03D 13/25      (2016.01)

(52) U.S. Cl.
  CPC ....... *F05B 2240/95* (2013.01); *F05B 2240/96* (2013.01); *H02G 3/30* (2013.01)

(56) References Cited

U.S. PATENT DOCUMENTS

| | | | | |
|---|---|---|---|---|
| 4,778,308 | A * | 10/1988 | Stove | E02B 17/025 |
| | | | | 405/204 |
| 6,371,695 | B1 * | 4/2002 | Davenport, III | E02B 17/00 |
| | | | | 405/204 |
| 8,240,955 | B2 | 8/2012 | Nies | F03D 13/22 |
| | | | | 405/204 |
| 8,864,419 | B2 * | 10/2014 | Broughton | E02D 27/425 |
| | | | | 405/202 |
| 2003/0168864 | A1 * | 9/2003 | Heronemus | B63B 1/047 |
| | | | | 290/55 |
| 2010/0194115 | A1 * | 8/2010 | Jakubowski | E02D 27/42 |
| | | | | 290/55 |
| 2012/0049532 | A1 * | 3/2012 | Scholte-Wassink | F03D 13/25 |
| | | | | 290/55 |
| 2012/0082514 | A1 * | 4/2012 | Horton, III | B63B 9/065 |
| | | | | 405/204 |
| 2012/0189390 | A1 * | 7/2012 | Belinsky | B63B 21/50 |
| | | | | 405/204 |
| 2014/0147272 | A1 | 5/2014 | Donescu et al. | |
| 2014/0248090 | A1 * | 9/2014 | Fernandez Gomez | E02B 17/025 |
| | | | | 405/196 |
| 2015/0198148 | A1 * | 7/2015 | Mello | F03D 13/25 |
| | | | | 416/244 R |

FOREIGN PATENT DOCUMENTS

| | | | | |
|---|---|---|---|---|
| GB | 2473058 A | 3/2011 | | |
| KR | 1020150145978 A | 12/2015 | | |
| WO | 2010103114 A1 | 9/2010 | | |
| WO | WO-2014114620 A1 * | 7/2014 | | E02B 17/02 |
| WO | 2015019664 A1 | 2/2015 | | |

* cited by examiner

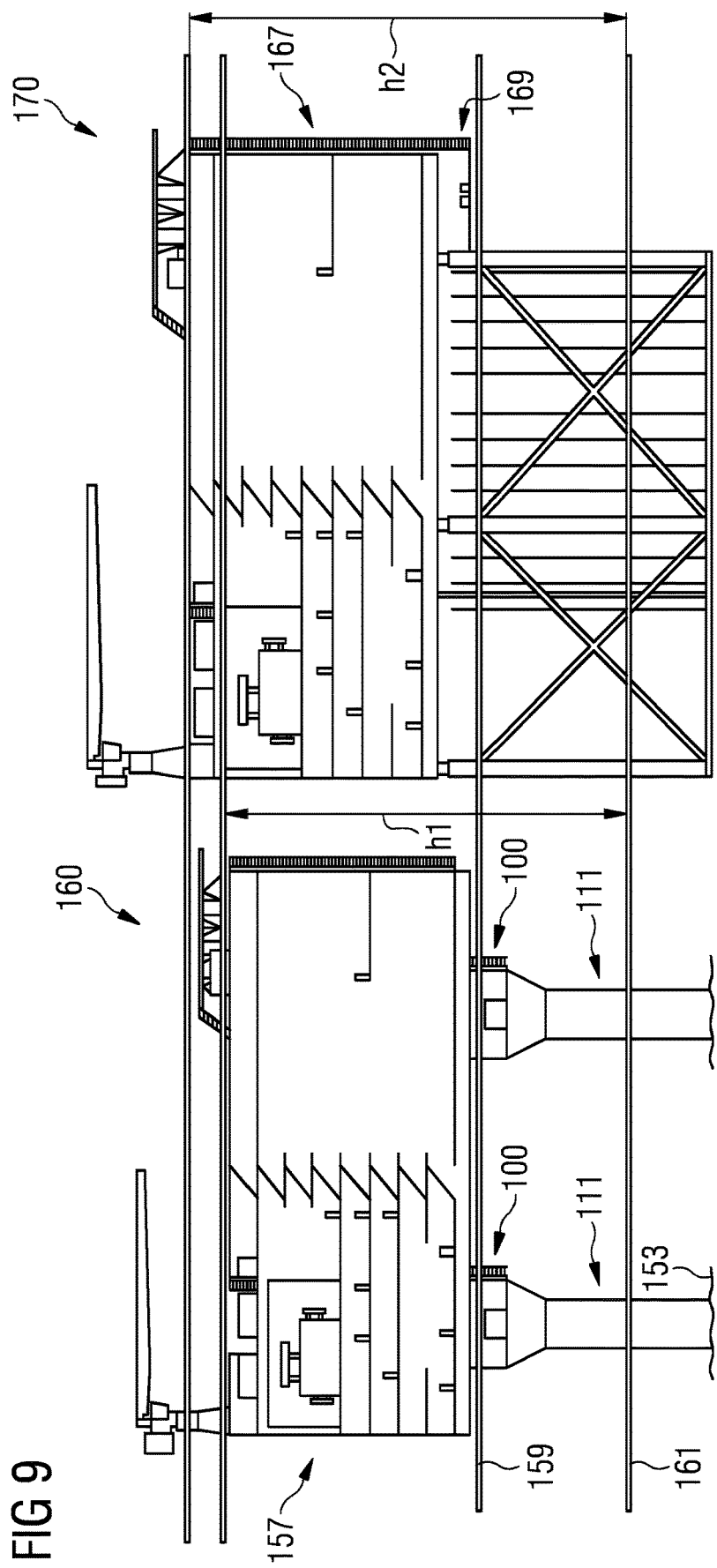

CONNECTION STRUCTURE FOR A MARINE INSTALLATION, MARINE INSTALLATION AND METHOD OF ERECTING A MARINE INSTALLATION

CROSS-REFERENCE TO RELATED APPLICATION

This application claims the priority, under 35 U.S.C. § 119, of European patent application EP 18157798.2, filed Feb. 21, 2018; the prior application is herewith incorporated by reference in its entirety.

BACKGROUND OF THE INVENTION

Field of the Invention

The present invention relates to a connection structure for connecting a seabed anchoring device to a superstructure for electric power engineering, further relates in one embodiment to a seabed anchor means, further relates to a connection structure arrangement, relates to a marine installation and further relates to a method for building a marine installation.

An offshore wind farm comprises a plurality of wind turbines, which are installed offshore and anchored to the seabed. The wind turbines typically provide a power flow as alternating voltage (AC). In order to transport the electrical power to shore, high-voltage direct-current transmission or else high-voltage alternating-current transmission can be used. For high-voltage direct-current transmission, a so-called HVDC substation can be used, in which the electrical power or flow of electrical power from a plurality of wind turbines is collected and transformed to a different voltage level and is transformed from alternating current to direct current for transport to the onshore grids.

Conventionally, such an HVDC substation is supported by a foundation consisting of a plurality of individual elements (e.g. steel pipes and pipe joints), which are dimensioned according to the structural load and welded together to form a heavy single object of 2000 t (tons) to more than 5000 t depending on the water depth. In this case, due to the size and a construction method with a high degree of manual production, the costs per ton of steel installed are comparatively higher compared to the groundworks for wind power installations built in large quantities. Furthermore, due to the size and mass of the foundation, a separate, more efficient crane ship is required for the installation than for an installation of wind power installations in wind farms, which additionally makes the installation more expensive.

To feed the power from the wind turbines directly to the HVDC platform, an average of approximately 12 to 17 AC underwater cables must be pulled onto the transformer platform. In order to protect the underwater cables from mechanical damage, they are provided with a very rigid sheath, as a result of which the cables have a relatively large bending radius of 3-5 m. In order not to have to work inside the substation when laying the cables with this large bending radius, the underwater cables are conventionally pulled in a cable jointing room in an HVDC substation first, which in most cases requires between 500 and 700 square meters of the lower deck area of a substation. Therefore, the entire substation necessarily becomes larger in dimension and heavy in weight and also expensive in cost. Alternatively, in individual cases, a separate cable deck has also been provided below the conventional HVDC substation, onto which the underwater cables are pulled and connected to the cables of the HVDC substation.

SUMMARY OF THE INVENTION

It is accordingly an object of the invention to provide a connection structure for a marine installation and a method of building a marine installation which overcome the above-mentioned and other disadvantages of the heretofore-known devices and methods of this general type and which provide for a simpler installation, and the construction can be carried out in a more cost-effective manner and can be executed in a space-saving manner.

With the foregoing and other objects in view there is provided, in accordance with the invention, a connection structure for connecting a seabed anchor to a superstructure for electrical power engineering, the connection structure comprising:

a vertical, horizontally encircling wall bounding a spatial region;

a first connecting section configured for connection to the superstructure; and a second connecting section configured for connection to the seabed anchor.

In other words, the objects of the invention are achieved by a connection structure for connecting a sea anchoring device having a superstructure for electrical power engineering, to a marine installation and to a method for building a marine installation.

According to one embodiment of the present invention, a connection structure for connecting a seabed anchor to a superstructure for electrical power engineering is provided, comprising: a horizontally encircling (for example annular closed), vertically extending (for example metallic) wall, which bounds a spatial region; a first (for example upper) connecting section, which is designed for connection to the superstructure; a second (for example lower) connecting section, which is designed for connection to the seabed anchor.

After full installation, the connection structure is arranged between the sea anchor (which is arranged partially below the sea surface) and the superstructure (which is arranged entirely above the sea surface). The connection structure may be made at least substantially of metal, in particular steel. The connection structure may have a height of, for example, between 2 m and 10 m and a lateral extent of, for example, between 5 m and 20 m in each case in two mutually perpendicular lateral directions.

The seabed anchor may be a structure anchored on and/or in the seabed and extending from the seabed to above the sea surface. The sea anchor may be formed, for example, as a pile, for example a substantially cylindrical tube or conically upward tapering tube or as a suction bucket. A connection to the seabed can be achieved, for example, by driving a part of a substantially cylindrical tube into the seabed. In other embodiments, the pressure of the water column is used to fix a suction bucket to the seabed.

The superstructure for the electrical power engineering may include electrical and electronic components for converting or transforming electrical power. The superstructure may include, for example, one or more transformers, one or more converters (for example AC-DC converters) and corresponding controls therefor. The superstructure may include a generator and other components such as switchgear installations.

The wall extending in the vertical direction may be made of steel, for example, and may be substantially closed in an annular manner in order thus to form a sleeve whose cross-sectional shape may, however, be different from a circular or oval shape. A cross-sectional shape of the horizontally encircling wall may, for example, be substantially rectangular or square, in particular with rounded corners. In particular, the wall can therefore have planar and thus straight sections, which can extend, for example, in two mutually perpendicular lateral directions as well as vertically. For example, due to the straight wall sections, a superstructure can be effectively supported if, for example, supporting walls or at least one supporting wall of the superstructure are located above straight wall sections of the horizontally encircling wall (after full installation or establishment of a marine installation).

After full installation, an annular plane of the horizontally encircling wall can lie, for example, in a horizontal plane. In this case, the horizontally encircling, vertically extending wall may have an annularly closed upper edge and an annularly closed lower edge, which, for example, are connected to the first or second connecting section or form the latter themselves.

The first connecting section is also referred to as the upper connecting section and serves to connect the connection structure to the superstructure. The second connecting section is also referred to as the lower connecting section, which serves to connect the connection structure to the seabed anchor. The connection of both the sea anchor and the superstructure to the connection structure can be performed with the aid of screws, with the aid of welding or grouting.

The first connecting section and/or the second connecting section may be formed as a part of the horizontally encircling wall. Alternatively, the first and/or the second connecting section may be formed by further separate components, which are connected to parts of the horizontal encircling wall.

The spatial region, which is bounded by the horizontally encircling wall, advantageously makes it possible to feed or electrically connect one or more underwater cables to cables of the superstructure. If the superstructure is connected to the connection structure, the spatial region can be completely closed, with the result that the cable or cable insulation can be protected against solar radiation, in particular UV radiation. The spatial region can be entered by operating personnel, for example, to establish connections between an underwater cable and a cable of the superstructure.

According to one embodiment of the present invention, the first connecting section has a circumferentially (in particular annularly) completely encircling (in particular closed) flange on the wall with vertically aligned through holes, through which screws for connection to the superstructure can be led. This provides a simple connection possibility with the superstructure. In addition to or alternatively to a screw connection, a connection between the first connection structure and the superstructure can also be achieved by welding, introducing grouting or by other methods.

According to one embodiment of the present invention, the connection structure further comprises a base, which is connected to the wall and at least partially closes the spatial region toward the bottom. The base may be of flat design and be oriented substantially horizontally when fully installed. The base may have an opening to an interior of the seabed anchor, through which opening, for example, an underwater cable can be led. In particular, the base may have a correspondingly sized opening for each of a plurality of underwater cables. Therefore, an underwater cable can advantageously be pulled from deep below upward either within a hollow seabed anchor or outside the seabed anchor, in order then to be electrically connected to terminals or cables of the superstructure, in particular within the spatial region.

According to one embodiment of the present invention, the second connecting section has a shape transition of a cross-sectional shape of the spatial region/the wall to a cross-sectional shape of an upper end of the seabed anchor. Therefore, the cross-sectional shape may change along the vertical direction. In particular, the shape transition may proceed from substantially square or rectangular to circular. A seabed anchor, which has a substantially circular cross section, may have relatively high stability and therefore may provide stable anchoring. On the other hand, a rectangular or square cross-sectional shape of the horizontally encircling wall can advantageously accommodate a load of the superstructure when the superstructure typically has linearly running supporting walls. Due to the shape transition, a stable support or foundation of the superstructure can thus be ensured.

According to one embodiment of the present invention, the connection structure further comprises at least one cable connector and/or cable plug within the spatial region in order to electrically connect an underwater cable to a cable of the superstructure. The spatial region may be sized to be large enough to accommodate an underwater cable or a cable of the superstructure within the spatial region in the bent state of, for example, 180°. An underwater cable or a cable of the superstructure may therefore be oriented and bent within the spatial region so as to be electrically connected to the desired cable connectors and/or cable plugs. Therefore, the superstructure can be reduced in its height or in its overall design in size since an intermediate deck region or connecting region for connecting cables within the superstructure can be avoided.

According to one embodiment of the present invention, the connection structure further comprises at least one, in particular self-priming, pump within the spatial region in order to supply and/or to discharge seawater as a coolant to and/or from the superstructure. The pump can be designed, for example, as a centrifugal pump. Conventionally, in conventional foundations, cooling water pumps have been arranged below the sea surface. As a result, they were very difficult to access and maintenance was very time-consuming and costly. According to the embodiment, however, pumps arranged in the spatial region are easily accessible by operators and thus can be easy to maintain.

According to one embodiment of the present invention, the connection structure further comprises a horizontal area (for example in the form of a balcony) attached to the wall and arranged outside the spatial region, and an, in particular reversibly closable, opening (for example designed as a door) in the wall in order to allow access from the spatial region to the horizontal area. For example, a cable winch may be temporarily placed or installed on the horizontal area in order to permit hoisting of an underwater cable through a J-tube either along an outer surface of the seabed anchor or within a hollow seabed anchor. The horizontal area can be bounded by a railing in an outdoor area. Therefore, a suitable place for installation of a rope winch can be provided so that a corresponding place on the superstructure (for example for power technology) can be saved.

According to one embodiment of the present invention, a connection structure arrangement is provided, which comprises at least two connection structures according to any of the above-described embodiments. These individual connection structures can be connected in such a way that respective flanges (or generally upper edges of the upper connecting section) of the first connection structures lie substantially in a horizontal plane. Advantageously, the connection structure arrangement may then be mounted and connected initially to a plurality of seabed anchor in order to subsequently mount the superstructure thereon in order to offset installation tolerances of the seabed anchor and to ensure that any vertical differences in the upper ends of the seabed anchor are offset by the uniformly vertically aligned connection structures.

When installing a superstructure, the horizontal plane of the two connected connection structures can be brought to a desired height (above sea level) and the connection structures located at this height can be connected to the respective seabed anchor. As a result, it can be ensured that the superstructure has a predetermined desired distance from the sea surface, after it has been connected to the connection structures by means of the upper connecting sections of the connection structures.

With the above and other objects in view there is also provided, in accordance with the invention, a marine installation, comprising:

a superstructure for power engineering;
a foundation as described above;
wherein the at least one connection structure is connected to said superstructure by way of the first connecting section.

In other words, the novel marine installation has a superstructure for power engineering; a seabed anchor; and at least one connection structure according to any of the preceding embodiments and/or at least one connection structure arrangement according to the preceding embodiment. The at least one connection structure is connected to the superstructure by means of the first connecting section and to the seabed anchor (for example at an upper end thereof) by means of the second connecting section.

In one embodiment of the present invention, the connection structure is substantially below a 100-year wave level and above a lowest tidal range level. The 100-year wave level can be regarded as the level that highly likely marks the height that can be reached by the highest water wave only once every 100 years. The lowest tidal range level may be the level of the sea surface that is not undershot. The superstructure can be completely above the 100-year wave level, thus protecting the superstructure even in the unlikely event that a 100-year wave occurs. A normal (or average) sea level may be between the 100-year wave level and the lowest tidal range level.

According to one embodiment of the present invention, the sea anchor comprises a hollow driven pile, which can be driven or is driven into a seabed and, in particular, has a smaller cross-sectional size than the spatial region; or (in one embodiment) a suction bucket, which can be anchored or is anchored to the seabed and, in particular, has a larger cross-sectional size than the spatial region.

Therefore, conventional seabed anchors can be supported. The driven pile can be driven, for example, between 30 m and 70 m into the seabed. The suction bucket can have a substantially larger cross-sectional area than the spatial region, for example, have a 2-10 times as large cross-sectional size. For example, the driven pile can have a cross-sectional size between 0.2 and 0.8 times that of the spatial region.

According to one embodiment of the present invention, the superstructure comprises an HVDC station, comprising an AC-DC converter system, in order to enable DC power transmission of AC power, in particular supplied by wind turbines, to a land station.

According to one embodiment of the present invention, at least one supporting wall of the superstructure is arranged vertically substantially in line with a section of the vertical wall of the connection structure. Therefore, the load of the superstructure can be advantageously transferred to the encircling wall of the connection structure and thus be supported in a reliable manner.

According to one embodiment of the present invention, the marine installation further comprises a sea cooling facility comprising supply pipes and/or discharge pipes, which are arranged at least partially within the seabed anchor and/or the spatial region of the connection structure. Therefore, space can also be saved within the superstructure, which conventionally has to be provided for a sea cooling facility.

It should be understood that features, which individually or in any combination in conjunction with a connection structure, with a connection structure arrangement or also a marine installation, may be applied, individually or in any combination, to a method for building a marine installation and vice versa according to embodiments of the present invention.

With the above and other objects in view there is also provided, in accordance with the invention, a method of erecting, or building, a marine installation. The method comprises:

anchoring a seabed anchor in a seabed;
connecting at least one connection structure having a first connection section to the seabed anchor by way of a second connecting section of the connection structure
connecting a superstructure to the first connecting section of the connection structure;
providing the connection structure with a horizontally encircling, vertically extending wall, which bounds a spatial region, between the first and the second connecting sections.

In other words, the novel method comprises: anchoring a seabed anchor in the seabed; connecting at least one connection structure to the seabed anchor by means of a second connecting section of the connection structure, in particular in a predefined vertical position; connecting the superstructure to the connection structure by means of a first connecting section of the connection structure, wherein the connection structure has a horizontally encircling (annularly closed), vertically extending (metallic) wall, which bounds a spatial region, between the first and the second connecting section.

The method may further comprise, within the spatial region, electrically connecting an underwater cable to a cable of the superstructure. Furthermore, the method may comprise pulling an end of an underwater cable into the spatial region.

Other features which are considered as characteristic for the invention are set forth in the appended claims.

Although the invention is illustrated and described herein as embodied in a connection structure for a marine installation and a method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 9 is a side-by-side comparison of a marine installation according to the invention and a marine installation according to the prior art.

The invention is not restricted to the illustrated or described embodiments.

DETAILED DESCRIPTION OF THE INVENTION

Figure 1:
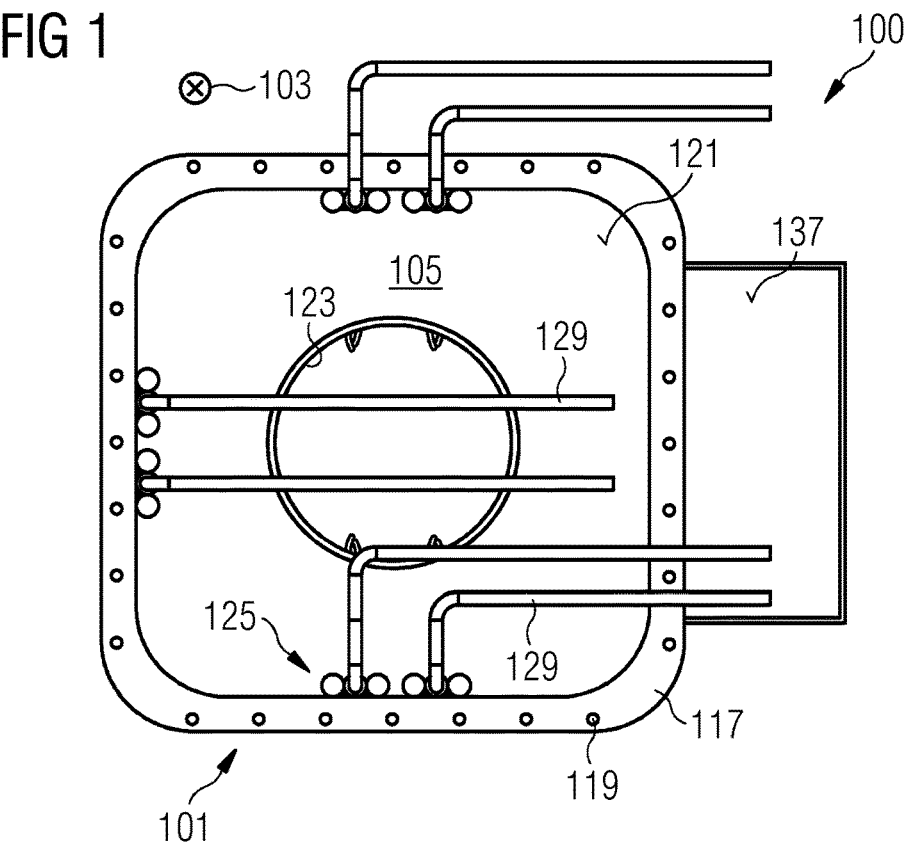
FIG. 1 is a schematic plan view onto a connection structure according to the invention.
Figure 2:
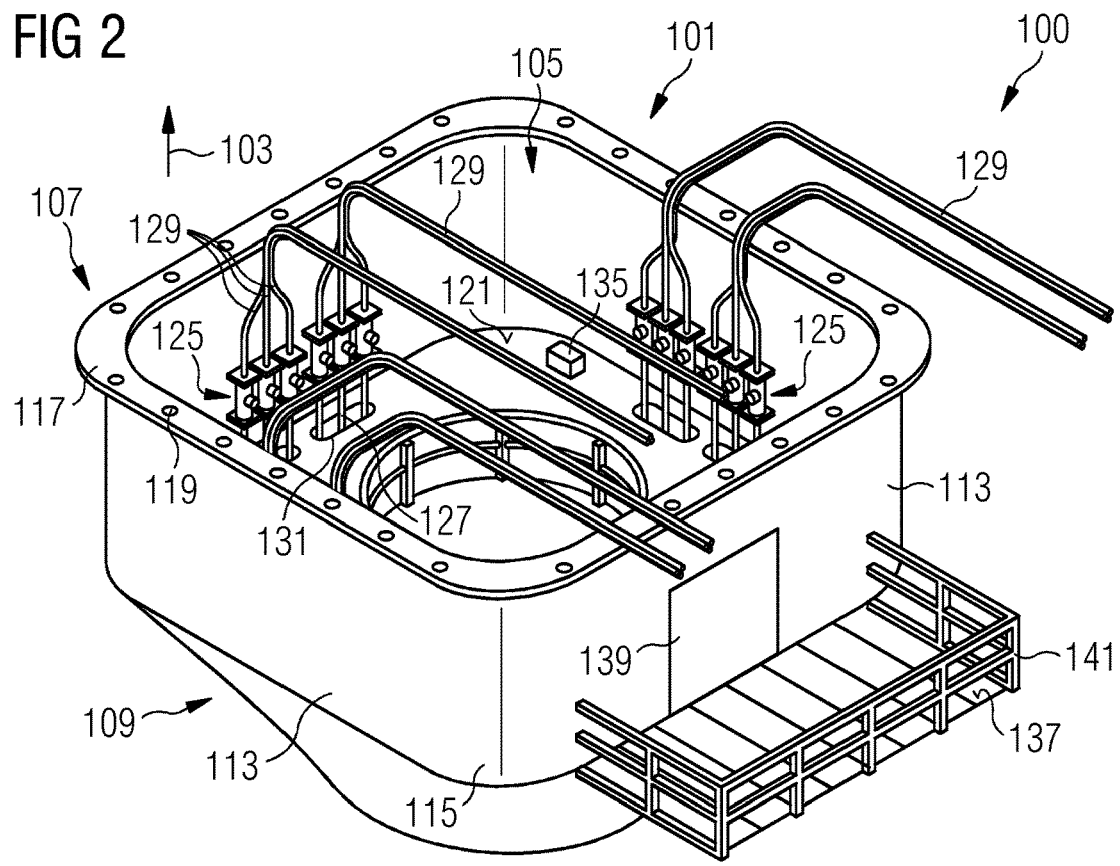
FIG. 2 is a top perspective view thereof.
Figure 3:
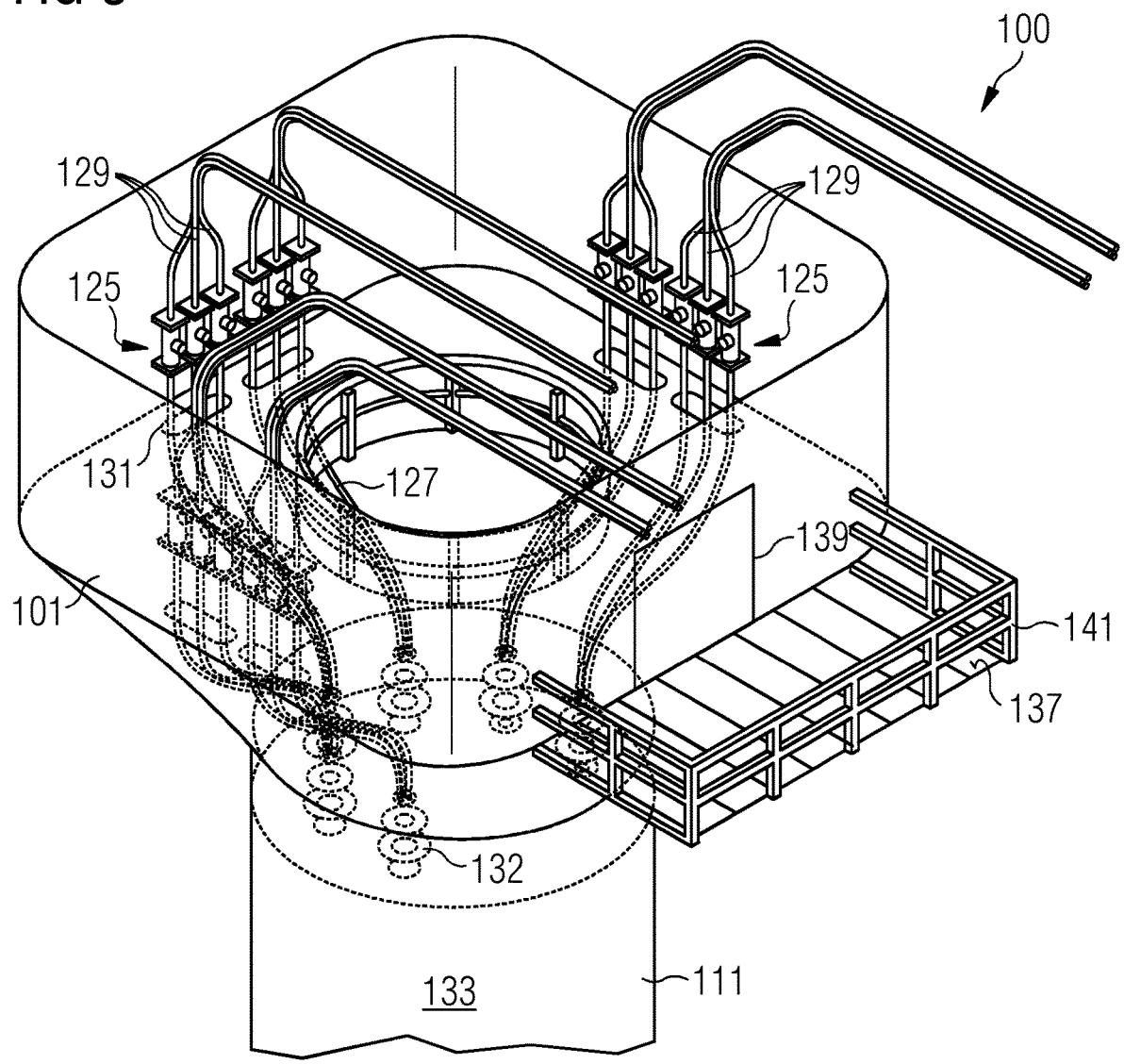
FIG. 3 is a similar perspective view showing specific cable runs and the connection to a seabed anchor.
Figure 4:
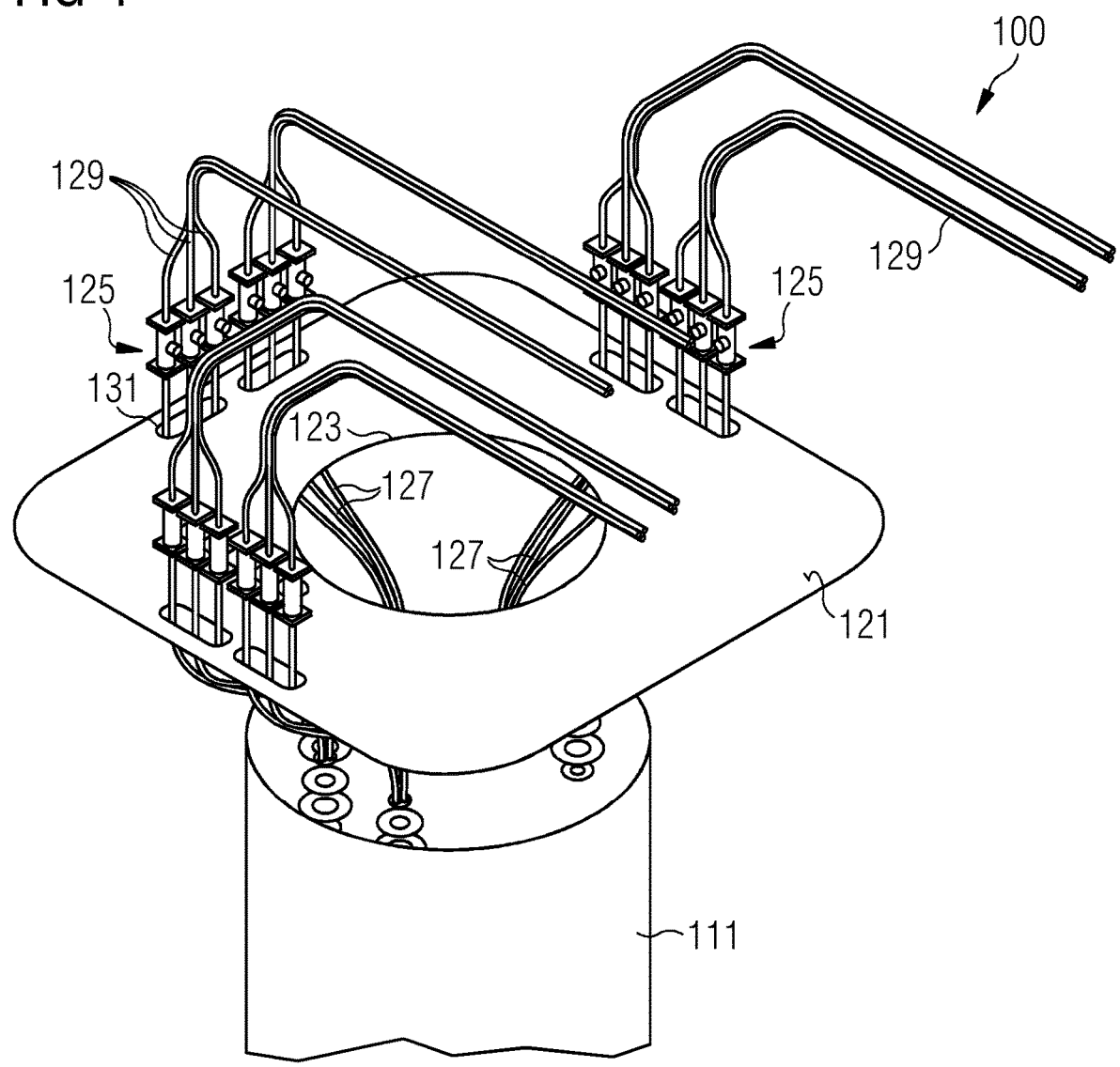
FIG. 4 is a perspective, partly broken-away detail of the connection structure and a cable connection to the seabed anchor.

Referring now to the figures of the drawing in detail and first, particularly, to FIG. 1 thereof, there is shown schematically illustrates, in a plan view along a vertical direction 103, a connection structure 100 according to one embodiment of the present invention. The connection structure is designed to connect a seabed anchor (also referred to as: seabed anchoring means, seabed anchoring device, or tower) to a superstructure for electric power engineering. The connection structure 100, which is illustrated in a schematic perspective illustration in FIG. 2, in a schematic perspective transparent representation in FIG. 3 and in a perspective, partially broken away view in FIG. 4, comprises a horizontally encircling metallic wall 101 extending in the vertical direction 103, which wall bounds a spatial region 105. Furthermore, the connection structure 100 has a first, upper connecting section 107, which is designed for connection to a superstructure for power technology. Furthermore, the connection structure 100 has a second, lower connecting section 109, which is designed for connection to a seabed anchor, which is partially shown in FIG. 4 and designated by reference numeral 111.

As can be seen from the plan view of FIG. 1, the shape of the encircling wall 101 is substantially square with planar sections 113 and with rounded edges or rounded corners 115. The first connecting region 107 has a circumferentially completely encircling flange 117, which is formed with through holes 119, through which screws can be led for connection to a superstructure. Therefore, the area formed by the flange 117 forms a plane defining the position of a lower section of a superstructure.

The connection structure 100 furthermore has a base 121, which is connected to the wall 101, and closes the spatial region 105 to (vertically) below, at least partially. The base has a central opening 123, through which, for example, an underwater cable can be pulled into the spatial region 105 from below the connection structure 100. Within the spatial region 105, a plurality of cable connectors and/or cable plugs 125 are arranged and mounted (for example on the wall 101) in order to electrically connect an underwater cable 127 to a cable 129 of the superstructure. In the illustrated embodiment, the underwater cables 127 are led through separate cable openings 131 in the base 121. The underwater cables 127 may also be led through further cable openings 132 in an upper region of the seabed anchor 111 into an interior 133 of the seabed anchor 111, as can be seen, in particular, in FIGS. 3 and 4.

In the illustrated embodiment of FIGS. 1 to 4, a centrifugal pump 135 is also arranged within the spatial region 105 in order to supply and/or discharge seawater as a coolant to and/or from the superstructure. For this purpose, feeds and discharges for the coolant within the spatial region are partially provided, which are not illustrated in FIGS. 1 to 4 for the purpose of simplification.

The connection structure further comprises a horizontal surface area 137 attached to the wall 101 and arranged outside the spatial region 105, and an, in particular, reversibly closable opening 139 in the wall 101 in order to allow access from the spatial region to the horizontal surface area 137. A railing 141 bounds the area 137 where it is not bounded by the wall 101. The opening 139 can be reversibly closed by a door (not illustrated). Additional equipment, such as a rope winch, can be arranged on the area 137 in order to pull up an underwater cable from below.

At least two of the connection structures illustrated in FIGS. 1 to 4 may be connected to form a connection structure arrangement according to one embodiment of the present invention such that respective flanges 117 of the respective connection structures lie substantially in a horizontal plane. This horizontal plane will be brought to a desired predetermined height above sea level and define an underside of the superstructure to be placed onto the connection structure.

Figure 5:
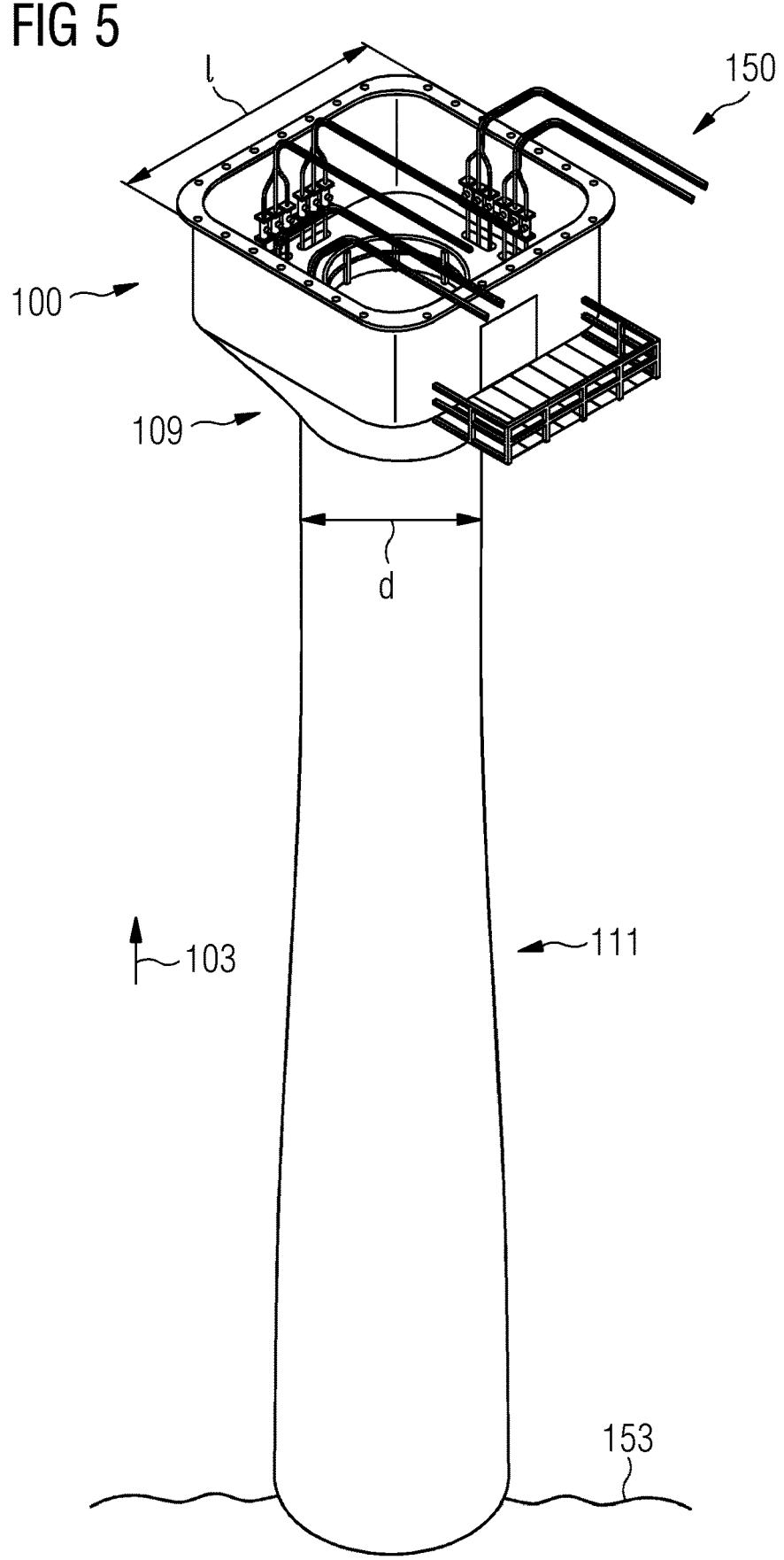
FIG. 5 is a perspective view of the connection structure and the seabed anchor.

FIG. 5 illustrates a foundation for a superstructure for electrical power engineering according to one embodiment of the present invention. The foundation 150, which is illustrated in a perspective view in FIG. 5, comprises a connection structure 100 according to one embodiment of the present invention (as illustrated, for example, in FIGS. 1 to 4) and a seabed anchor 111, which is anchored in a seabed 153. The seabed anchor 111 is formed in the embodiment illustrated in FIG. 5 as a hollow driven pile, which is driven into the seabed 153 and has a circular cross-sectional shape whose diameter d is smaller than a side length l of the cross section of the spatial region 105 or of the encircling wall 101.

The seabed anchor 111 is connected at an upper end to the lower connecting section 109 of the connection structure 100, for example by grouting, welding, screwing, etc. The connection structure 100 has a shape transition 155 (see FIG. 6) of a cross-sectional shape of the spatial region 105 or of the wall 101 to a cross-sectional shape of an upper end of the seabed anchor 111. The shape transition 155 in this case proceeds essentially from square to circular, as can be seen in FIGS. 5 and 6.

Figure 6:
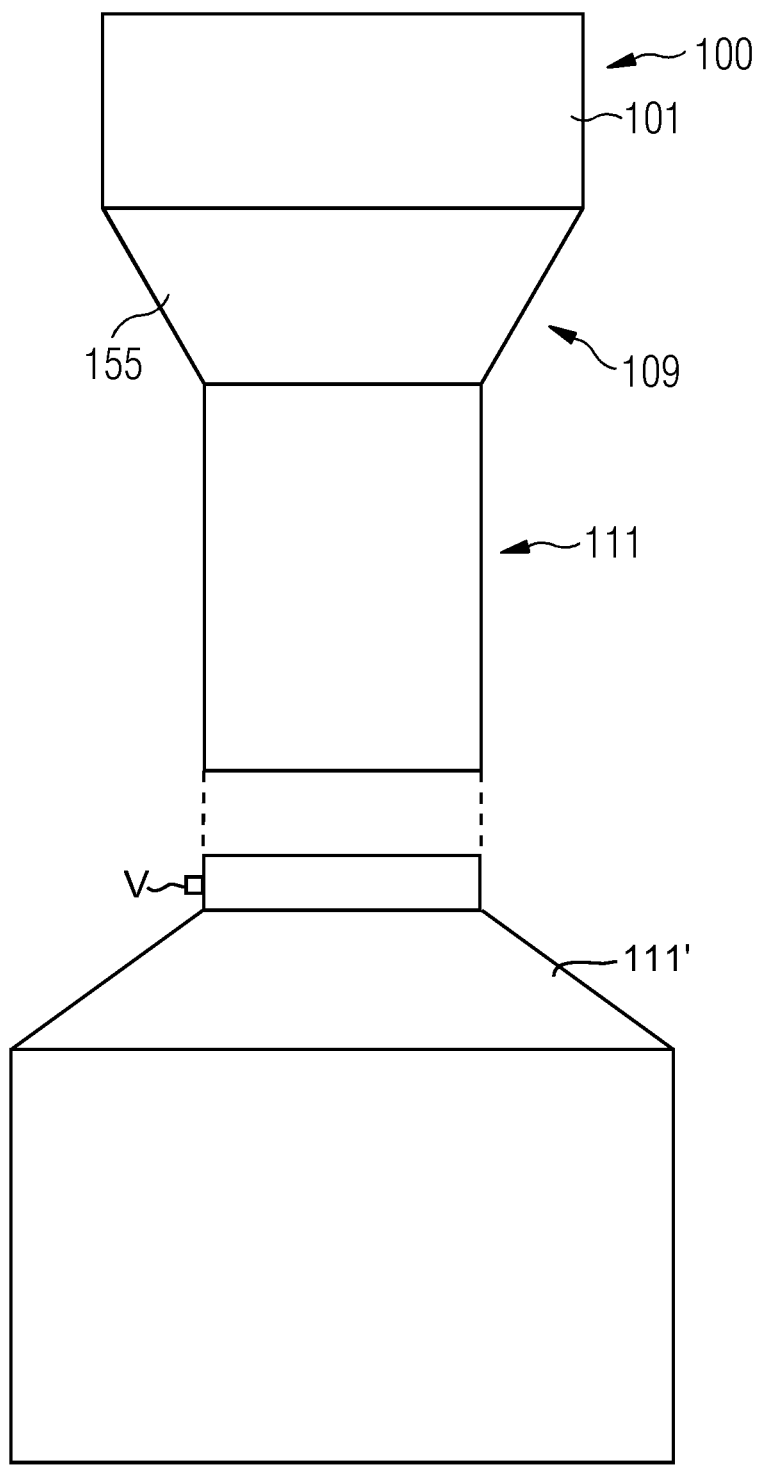
FIG. 6 is a schematic side view showing the connection between a seabed anchor and a lower part of the connection structure, as well as a highly schematic view of a suction bucket.

FIG. 6 further illustrates, in a highly schematic view, a suction bucket 111'. The suction bucket has a cross-sectional area that is larger than the cross-sectional area of the connection structure 100. Typically, the bucket will have a diameter such that its cross-sectional area is 2-10 times greater than that of the connection structure 100. There is also provided an evacuation valve V for aspirating water out of the suction bucket 111' during its installation in the seabed.

FIG. 5 illustrates, in a schematic perspective view, a foundation 150 according to one embodiment of the present invention, said foundation having a single connection structure 100 according to one embodiment of the present invention, as well as a single seabed anchor 111, here in the form of a pile or piling 111. According to other embodiments, a foundation comprises four seabed anchors, each with associated connection structures 100.

Figure 7:
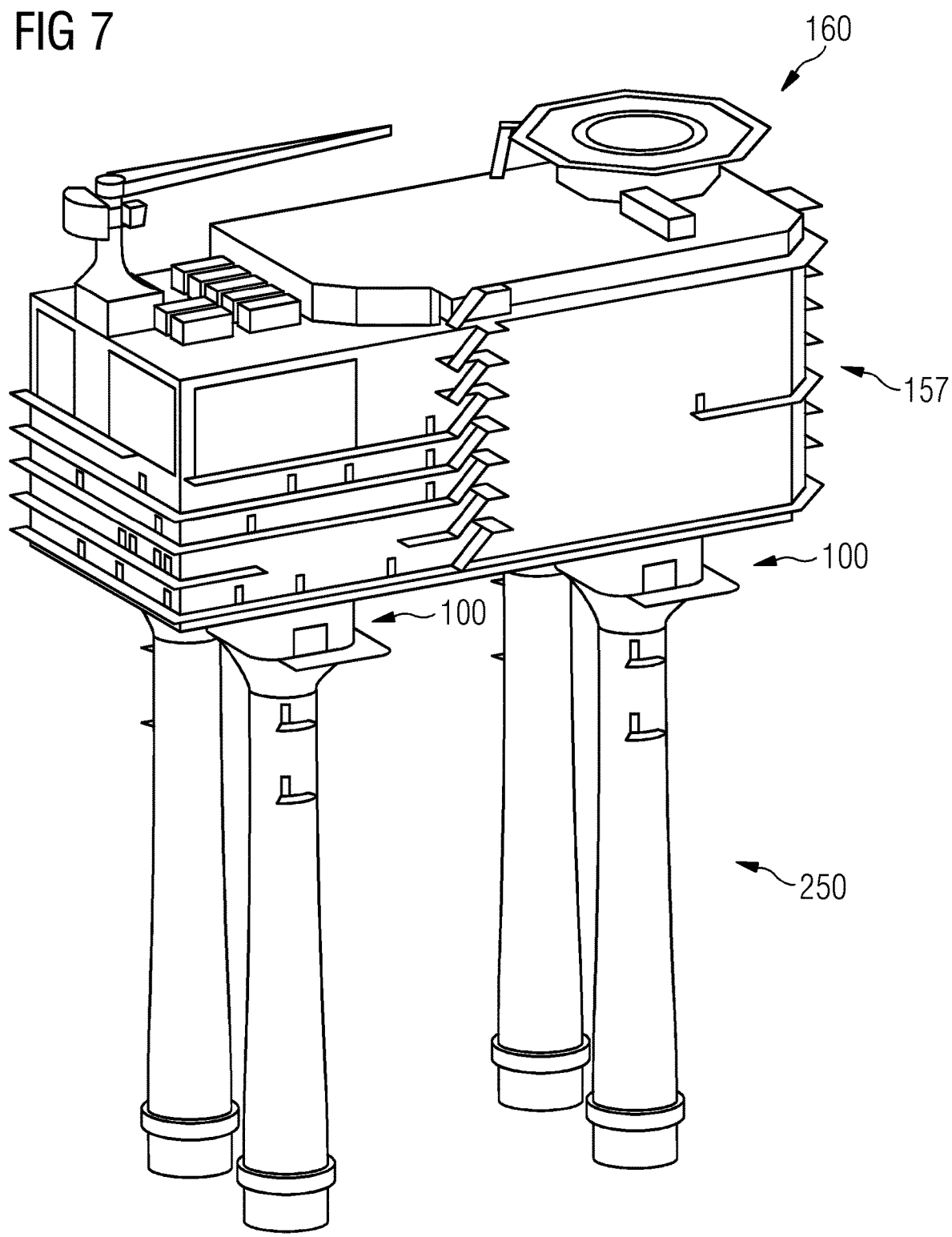
FIG. 7 is a perspective view of a marine installation supported by four foundation piles.

FIG. 7 illustrates, in a schematic perspective view, a marine installation 160 according to one embodiment of the present invention. The marine installation has a superstructure 157 for power engineering and a foundation 250, which is formed, for example, by four foundations 150, as illustrated in FIG. 5. Therefore, the superstructure 157 is mounted on the flanges 117 (see FIG. 2) of the respective connection structures 100.

Figure 8:
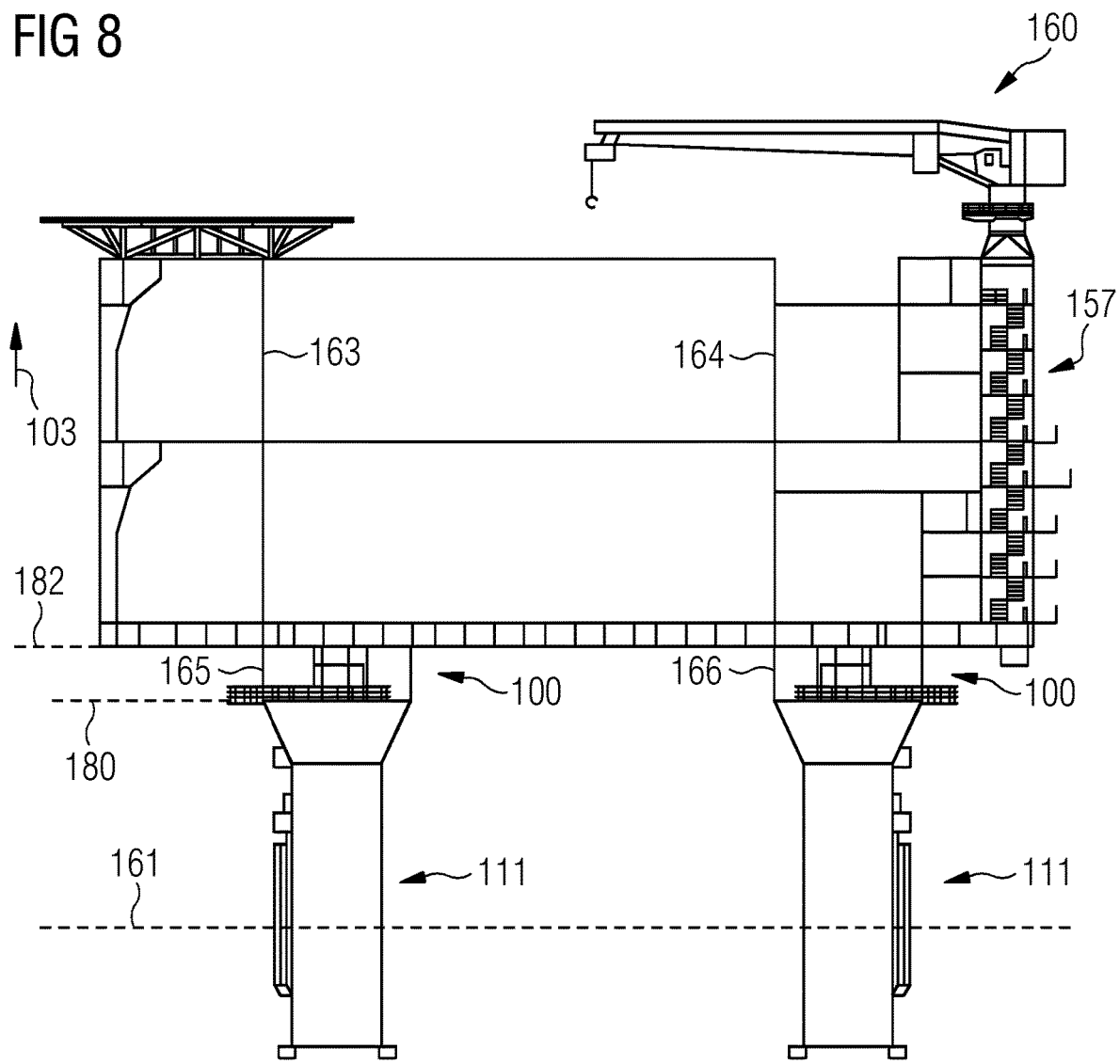
FIG. 8 is a partial side view of the marine installation.

FIG. 8 illustrates a schematic side view or side sectional view of the installation 160, which is illustrated in FIG. 7 in a perspective view. The superstructure 157 in this case comprises a supporting wall 163 (or 164), which is arranged vertically (that is to say in the vertical direction 103) substantially in line with a section 165 (or 166) of the vertical wall 101 of the connection structure 100. This achieves an improved support of the superstructure 157. A cable deck level 180 is below a lowest level 182 of the superstructure 157.

FIG. 9 shows a schematic side view of a marine installation 160 as compared to a conventional marine installation 170. Line 161 illustrates a lowest tidal range level and line 159 illustrates a 100-year wave level. As can be seen in FIG. 9, the connection structure 100 is located substantially below the 100-year wave level 159, but substantially above the lowest tidal range level 161.

The conventional marine installation in the conventional superstructure 167 comprises a bottom deck 169, which is used to connect and pull up cables.

Pulling up and connecting cables is performed according to one embodiment of the present invention within the spatial region of the connection structure 100, thus being able to save the connection deck 169 of the superstructure, whereby a total height h1 of the marine installation 160 according to one embodiment of the present invention can be achieved, which total height h1 is lower (for example by 3 to 6 m) than a total height h2 of the conventional marine installation 170. The heights h1, h2 are each measured here with respect to the lowest tidal range level 161.

The foundation, such as illustrated in FIG. 5 or illustrated in FIG. 7 below the superstructure, may be used for various component parts of an offshore wind farm. According to embodiments of the present invention, an underwater cable or cable of the superstructure in the conical part (see, for example, the transition region 155 in FIG. 6) of the connection structure 100 is led along the walls, in order to ensure sufficient space for the connection within the spatial region of the connection structure 100. This optimization can lead to a reduction in the weight and the volume of the superstructure, since the cable deck (for example deck 169 of the conventional superstructure 167 in FIG. 9) can be omitted. Another positive aspect is that the cable tension is located within the spatial region of the connection structure so as to always be independent of the weather, without the need for a temporary housing, which in turn can save time and money.

Three of the foundation piles illustrated in FIG. 7 can serve here as a cable guide for up to 16 AC cables (33 kV, 66 kV) and two DC cables. The fourth foundation pile may be specifically embodied to receive the cooling water pumps of an HVDC system. For example, an open sea cooling water system can be implemented. The use of self-priming centrifugal pumps (for example pump 135, illustrated in FIG. 2) above the water line within the spatial region of the connection structure instead of submersible pumps previously used for the HVDC platform may improve accessibility, and thus may simplify maintenance and reduce possible repairs. Conventionally, the submersible pumps had to be pulled out of the water and, in the process, divided into several sections in a time-consuming manner in order to access the actual pump head at the inlet of the rising pipe.

The connection structure 100 may also be considered as an expansion of the cylindrical structure to a square structure. This expansion can bring several advantages: on the one hand, the flow of force and the introduction of force from the superstructure into the connection structure can be optimized. This can lead to reduced deflection and to a saving of material in the region of the double base of the superstructure. On the other hand, cable tension and cable connections can be performed in a closed space (the spatial region 105) and are thus independent of external weather conditions.

An additional cable deck for the superstructure may thus be superfluous. This can save volume inside or below the superstructure. In addition, the spatial region may be used as a cable connecting space and may be in the range of the influence zone of a one-hundred-year wave. This can lead to a possible reduction in the height of the structure. The dimensions of the expansion of the connection structure and the upper flange may, despite installation tolerances, make an optimum flow of power into the transverse and longitudinal walls of the double base of the superstructure possible. The dimensions of the connection structure can be chosen so that the (supporting) walls of the superstructure represent an extension of the main walls or of the supporting walls of the superstructure. In order to prevent thermal influencing by a welded connection and to avoid the resulting necessary offshore coating work after installation of the superstructure, in a preferred embodiment, the connection between the connection structure and the superstructure should be designed as a screw connection by means of an inner or outer flange. Alternatively, a positively locking connection by means of grouting or the equivalent can be performed.

The combination of four foundation piles (as illustrated, for example, in FIG. 7) can be used as a foundation for a superstructure of approximately 10,000 tons. In this case, up to approximately 16 AC cables plus two DC cables can be led inside three of the four foundation piles. The fourth foundation pile can provide sufficient space for housing the pipes and pumps for the cooling water circuit. The upper part of the connection structures can in this case preferably be designed so that it serves to position directly adjacent connection structures on the foundation piles prior to the grouting process.

According to embodiments of the present invention, the cable coming from the clusters of the wind farm can be pulled vertically up to below the ceiling of the transition structure within the foundation piles by means of deflection rollers. The tensile force can be exerted here on the cable by means of deflection rollers by means of a temporarily erected rope winch lying outside the interior. If the cable is fully raised, the cable hang-off can be produced directly below the connection structure, in the parallel part of the foundation pile, on a hang-off deck. In this case, the outer sheathing of the cables is removed and the steel reinforcement contained is fixed by means of a flange in order to produce a strain relief of the underwater cables. In order to be able to pull the cable as described, a circular opening (for example 123 shown in FIG. 1) is provided in the deck of the connection structure. If the cable hang-off has been completed, the cables are lowered again, led on the hang-off deck in the outer diameter of the deck, and the complete outer insulation is removed. From there, the individual cores of the cables are led along the conical wall of the connection structure and led vertically through openings of the cable deck in the transition or connection structure. There, the cables can be connected to the platform internal systems and be led further through the platform.

Pipes and pumps of a cooling water circuit can be installed within a foundation pile. If installed above the lowest tidal range level, the suction pumps used previously could be replaced here by centrifugal pumps. The pumps arranged above the water level can therefore be easily maintained by access to the spatial region.

Due to the cable routing within a foundation pile, it is possible, according to the prior art except for the two export cables, to dispense with a steel cable guide in the form of a J-tube and to use a flexible cable lead-through together with flexible cable protection.

In one embodiment, instead of a driven pile 111, a foundation structure with one or more, for example three, suction buckets 111' may also be used (cf. FIG. 6). In that case, other advantages may be produced, such as, for example, prevention of the pile driving process during installation, no underwater grouting operation offshore, reduction of crane ship lifting capacity compared to a jacket installation or even abandonment of crane ship operations for the foundation installation, offshore by self-floating transport. Another advantage of this design is that the entire system can be fitted with all attachments without the component parts being exposed to the high acceleration forces and fatigue during the pile driving process. In this case, the connection structure can be extended downward according to the water depth and the installation site and be disassembled at the bottom end with the suction buckets (suction cans) as a complete unit as a foundation structure.

The invention claimed is:

1. A marine installation, comprising:
   a superstructure for power engineering, said superstructure containing a high voltage direct current substation having an alternating current to direct current converter module in order to enable DC power transmission of AC power to an onshore station;
   a foundation having a number of connection structures for connecting a seabed anchor to said superstructure, each connection structure including:
   a vertical, horizontally encircling wall bounding a spatial region;
   a first connecting section configured for connection to said superstructure; and
   a second connecting section configured for connection to the seabed anchor, said second connecting section having a shape transition of a cross-sectional shape of said encircling wall to a cross-sectional shape of an upper end of the seabed anchor, said shape transition proceeding from substantially rectangular to circular; and
   at least one self-priming pump within the spatial region in order to supply and/or to discharge seawater as a coolant to and/or from the superstructure;
   a number of seabed anchors and the number of connection structures being equal and being one or more;
   wherein each of said seabed anchors is connected to a respective said connection structure by way of said second connecting section;
   wherein said at least one connection structure is connected to said superstructure by way of said first connecting section;
   a sea cooling facility with supply pipes and/or discharge pipes, which are arranged at least partially within the seabed anchor and/or within the spatial region of said connection structure.

2. The marine installation according to claim 1, wherein a shape of said encircling wall is substantially rectangular or square, and said encircling wall is formed with planar sections and rounded corners between said planar sections.

3. The marine installation according to claim 1, wherein said first connecting section has a circumferentially completely encircling flange on said encircling wall, said flange being formed with through holes for screws for connection to the superstructure.

4. The marine installation according to claim 1, wherein said connection structures have a base connected to said encircling wall and at least partially closing off said spatial region toward the bottom.

5. The marine installation according to claim 1, wherein said connection structures have at least one cable connector and/or cable plug within said spatial region for electrically connecting an underwater cable to a cable of the superstructure.

6. The marine installation according to claim 1, wherein said connection structures have:
   a horizontal surface area attached to said encircling wall outside said spatial region; and
   a reversibly closable opening formed in said encircling wall in order to allow access from said spatial region to said horizontal surface area.

7. The marine installation according to claim 1, wherein said number of said connection structures and said number of said seabed anchors is four.

8. The marine installation according to claim 1, wherein said connection structure is disposed substantially below a 100-year wave level and above a lowest tidal range level.

9. The marine installation according to claim 1, wherein each said seabed anchor comprises:
   a hollow driven pile to be driven or driven into a seabed below said superstructure and said pile having a smaller cross-sectional size than the spatial region of the connection structure; and/or
   a suction bucket to be anchored or anchored to the seabed by way of a pressure difference and said suction bucket having a larger cross-sectional size than the spatial region of the connection structure.

10. The marine installation according to claim 1, wherein said superstructure has at least one supporting wall arranged vertically substantially in line with a section of said vertical wall of said connection structure.

* * * * *